No. 854,572. PATENTED MAY 21, 1907.
A. R. FITCH.
SCALE AND CHORD CIRCLE.
APPLICATION FILED APR. 19, 1905.
2 SHEETS—SHEET 1.
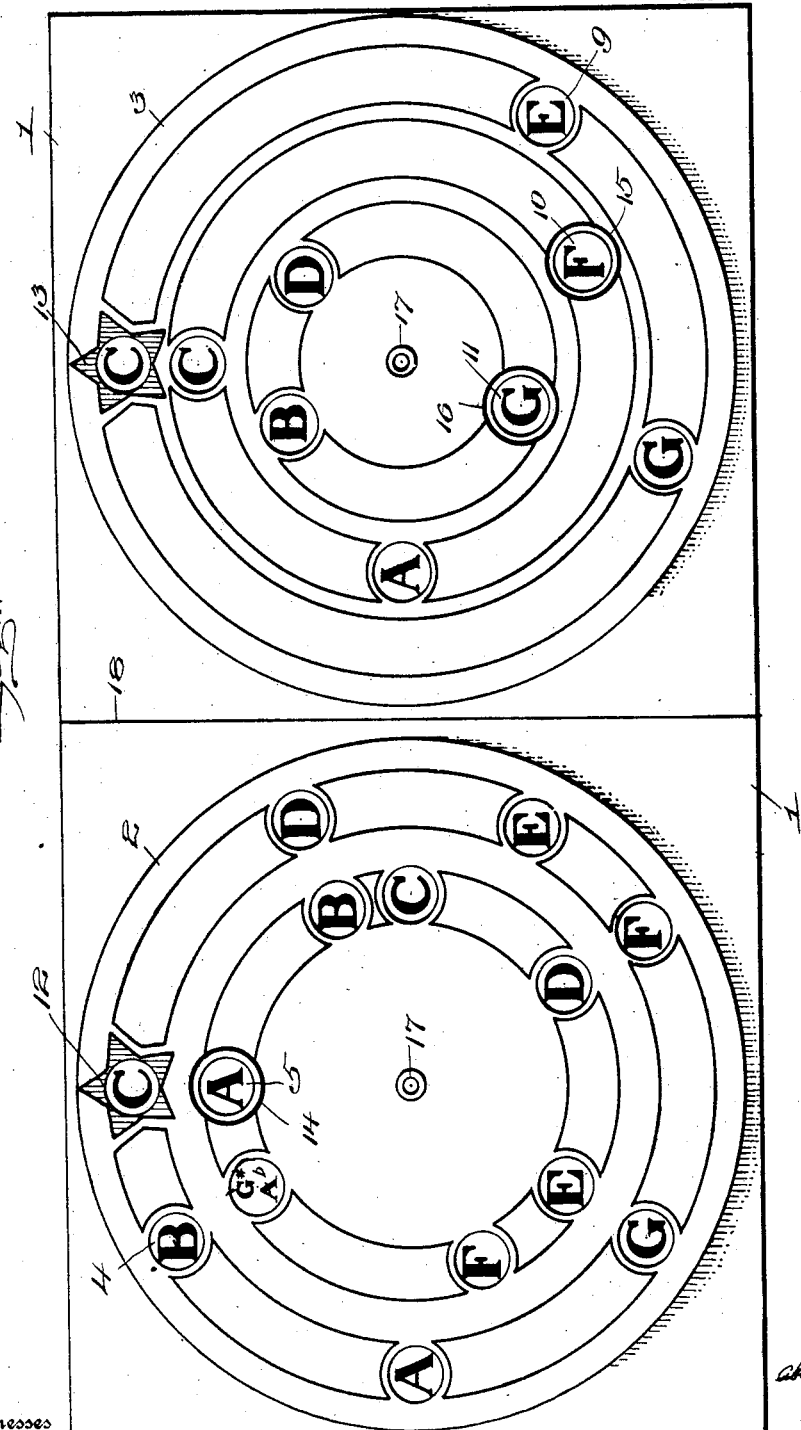

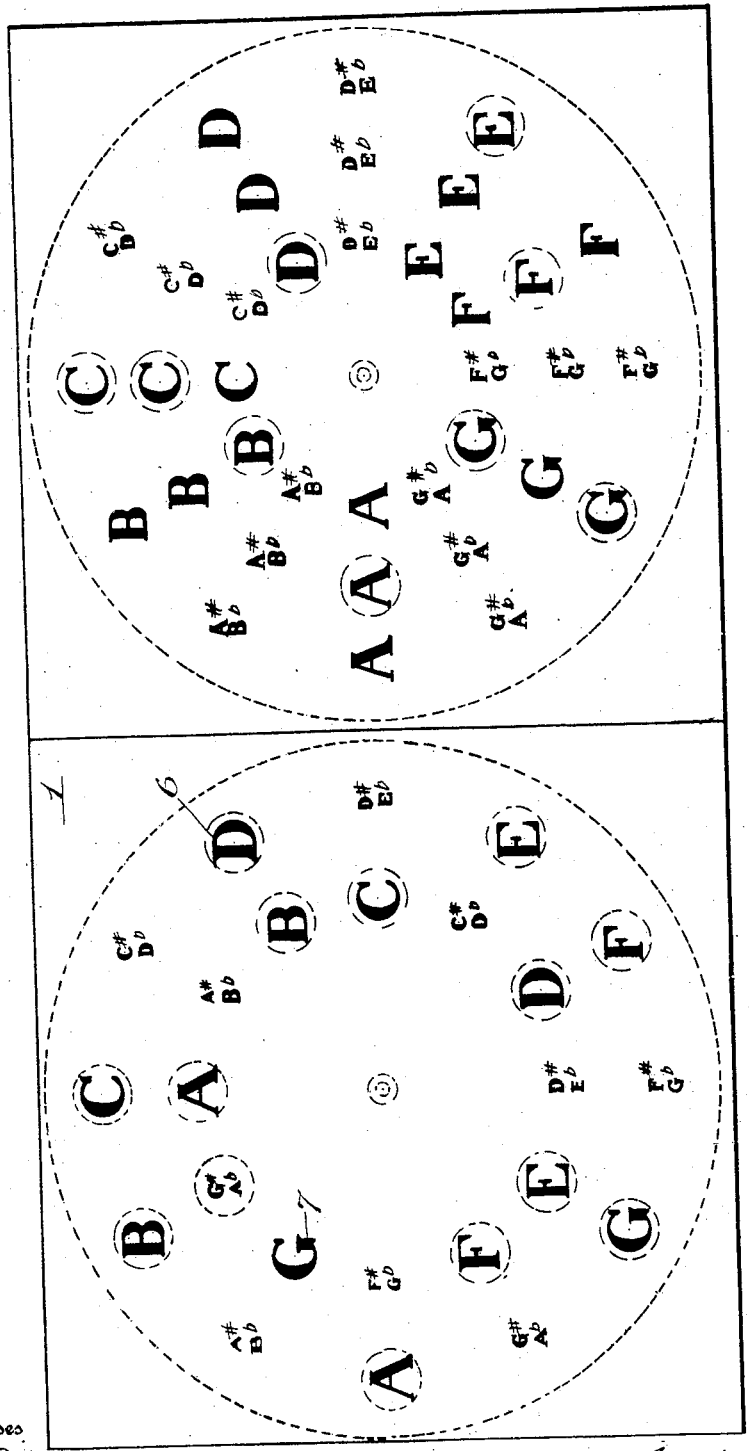

UNITED STATES PATENT OFFICE.

ABBIE R. FITCH, OF DENVER, COLORADO.

SCALE AND CHORD CIRCLE.

No. 854,572.  Specification of Letters Patent.  Patented May 21, 1907.

Application filed April 19, 1905. Serial No. 256,335.

*To all whom it may concern:*

Be it known that I, ABBIE R. FITCH, a citizen of the United States, residing at Denver, in the county of Denver and State of Colorado, have invented certain new and useful Improvements in Scale and Chord Circles; and I do hereby declare the following to be a full, clear, and exact description of the invention, such as will enable others skilled in the art to which it appertains to make and use the same.

This invention relates to improvements in charts or mechanism for use in musical instructions and particularly in teaching the relation of scales both major and minor and in giving instructions as to the chords in the different scales, the relation of the chords being such that the playing of accompaniments upon the piano with notes in the base and treble is greatly facilitated.

The invention comprises certain novel constructions, combinations and arrangements of parts as will be hereinafter fully described and claimed.

In the accompanying drawings: Figure 1 is a top plan view of my improved chart showing the disks arranged for giving instruction both as to the scale and as to the chords of various musical keys. Fig. 2 is a similar view showing the back of the chart with the disks which are normally applied thereto removed.

My improved musical chart is so constructed that the various tones in a given scale can be quickly ascertained with accuracy and when the tones in a major scale are found the corresponding harmonic minor tones are also at once made apparent. The device is also so constructed that changes can be made incidentally to other scales. Thus all the musical combinations may be set forth with quickness and accuracy. The device also makes it a simple matter to ascertain the different chords that belong to the different scales and the chord revealing feature makes it possible to play accompaniments upon musical instruments and especially upon the piano, the tones for the base and treble being indicated.

In carrying out the invention in a practical form I usually employ a chart having a back or supporting card or board as 1, upon the front of which are movably secured rotating members usually disks as 2 and 3. The disk 2 is provided with a series of apertures 4 arranged in a circle adjacent to the outer edge of the disk and within this circle of apertures is a second circle of apertures 5. The apertures 4 and 5 are arranged so as to be used in connection with indications or letters placed upon the back card or board 1.

As shown in Fig. 2 the back or back card 1 is provided with an outer circle of musical notations as at 6, and an inner circle of musical notations 7. These circles are of diameters corresponding with the diameter of the outer and inner circles of apertures 4 and 5 formed in the disk 2. The outer circle contains all the notations including whole and half-tones in one complete chromatic scale. The natural tones are indicated by capital letters as A—B—C—D—E—F and G. Arranged at proper intervals between some of these are the sharps and flats, as for instance between A and B are a sharp and *b* flat. This of course refers to the same tone and between C and D are the marks or notations *c* sharp and *d* flat and between D and E are arranged *d* sharp and *e* flat, between F and G, *f* sharp and *g* flat and between G and A appear *g* sharp and *a* flat. In the inner circle the notations are arranged in the same order with respect to each other but are set opposite different notations in the outer circle. Thus A in the inner circle is arranged opposite C in the outer circle so that when the card 2 is placed over these notations so that a mjaor scale appears in the apertures 4 the corresponding or relative harmonic minor scale will appear in the inner row of apertures 5.

The disk 2 is preferably pivotally connected at its center with the back or card 1 as at 17 so that the said disk may be rotated, its circle of apertures 4 and 5 being concentric with the circles of chromatic notations upon the back or card 1. The apertures 4 are so set with full length spaces between the whole tones of the scale as between C—D, D—E, F—G, G—A, A—B and with half length spaces between B and C and E and F that the natural scale will always be formed no matter to what position the card or disk 2 may be moved, having the half tones between the third and fourth and seventh and eighth of the scale. The apertures 5 are set opposite the apertures 4 so that the minor harmonic scale will always appear in exact correspondence with the proper major scale.

The notation and the arrangement of the apertures with the disk or rotating member 3 is arranged in a different manner. The card or board 1 beneath the said disk 3 is provided with three concentric rings of notations all of which are alike and arranged in the same order as clearly shown in Fig. 2. These notations extend outwardly radially from the inner circle, as in fact do the notations beneath the disk 2. The disk 3 is also provided with three circles of openings, namely an outer one composed of the apertures 9, an intermediate one composed of the apertures 10 and an inner one made up of the apertures 11. The apertures in each of these rings are arranged so as to register with the notes in any given key which form the chords in that key. Thus as illustrated in Fig. 1, when the disk is turned so that the upper circle covers "C" indicating the key of "C," there will be found exposed in the same circle through the apertures 9, E and G forming a chord with C. At the same time in the intermediate circle another chord made up of the tones C, F and A will appear while in the inner circle will be shown the tones B, D and G. All of these chords are harmonious with the key of C.

In using each of the disks I employ a configuration arranged about one of the openings in the outer circle, as for instance a star, as shown at 12, on the disk 2 and a similar star as shown at 13, upon the disk 3, to designate the opening which should be brought over the notation which indicates the name of the key. Thus if the key of C is the one to be used the star 12 is brought over the notation C. I also place a circle as 14, or other distinguishing mark around the adjacent opening in the inner circle on the card or disk 2 to draw the attention to the name of the corresponding harmonic minor scale. In using the chord selecting disk I also employ in addition to the star 13, other indications or marks about apertures 10 and 11 in the intermediate and inner circles. Thus a circle 15 is arranged in the intermediate circle and when the disk is turned to the key of C the said circle 15 will surround the aperture covering the notation F. In the inner circle of apertures a circle 16 is arranged about the aperture covering G. These circles and markings surrounding the apertures are useful in determining the chords for playing an accompaniment upon the piano or other instrument. In playing the chords as shown by the disk 3 C should be taken as the basis of the chord in the base whereas C with the other letters exposed in the outer circle of apertures 9, namely E and G, should be taken for the chord in the treble. In changing the chords for another portion of the same key the intermediate circle may be used F being taken for the base chord while all three letters shown in the intermediate circle are played for the treble. The next change in the chord can be made by taking G which is exposed through the circle 16 as the base chord while all of the letters exposed in the inner circle are used in the treble. In order to change the key and still have the chords thus assorted or arranged it is only necessary to turn the card or disk 3 so as to bring the star 13 over the letter or sharp or flat which is to designate the new key. The other apertures will then designate the new series of tones composing the chords and the chord changes which can be made in each key. The card 3 like the card 2 is pivotally secured in position upon the back or board 1 at its center as indicated at 17 so that the said card or disk 3 can be readily rotated over the notations carried by the back card or board 1. Since the two cards are shown together for designating the different keys and showing all the major and minor tones as well as the chords incident to the various keys it is preferable to mount both of the disks 2 and 3 upon a single back or card 1 and in making the device of card or other like board it is desirable to fold the back as for instance at the line 18 extending between the disks. When the device is not in use it may thus be made to occupy less space. It is also convenient in this form for carrying about from place to place.

I do not wish to be understood as limiting myself to the securing of the disks or rotating cards 2 and 3 to a single back or board or to a folded back since it will be apparent that the backs for each of the disks or rotating cards may be separated there being one provided for each card or rotating disk all within the spirit of the present invention.

From the above description it will be evident that the device is exceedingly simple and that its accuracy can be always depended upon for indicating the tones in different keys as well as the chords and combinations in the different keys and the change from one key to the other, which is sometimes a difficult thing to accomplish, can be easily and accurately performed in connection with this device. The card arranging disk will also be found very valuable for enabling one to readily produce an accompaniment to any music it only being necessary to select the proper key which of course will correspond with the key of the music which is being rendered. The device is not only useful and exceedingly helpful for instructon to beginners but will always be found a source of help by those who have had greater experience in changing a piece of music from one key to another and also in finding the minor scales as well as other combinations. Although I prefer to form the disks or rotating cards 2 and 3 of a circular shape it will be evident that they may be many sided if preferred and it will also be evident that instead of securing them pivotally at the center they may be secured at the edges in such a manner that they can be readily turned in concentric relation to the circles of notations upon the back 1. In producing the article for use it is desirable also to make the designations of one color while the stars 12 and 13 and the circles 14, 15, and 16, may be made of a different color so as to readily attract the eye and increase the facility with which the device may be manipulated. I also consider other changes in the minor details of construction as well within the meaning and spirit of the invention.

Having thus fully described my invention, what I claim as new and desire to secure by Letters Patent, is:

1. A musical chart comprising a back embodying the characters of the chromatic scale spaced at equal intervals about a circle, the characters of the chromatic scale equally spaced about an inner concentric circle and with similar characters in the two scales spaced at an interval of approximately 90 degrees, a disk centrally pivoted concentrically with the circles and provided with openings positioned to register with the outer circle and exhibit characters and spaced to correspond with the intervals of the major diatonic scale and with openings positioned to register with the inner circle and exhibit characters and spaced to correspond with the interval of the minor diatonic scale, and so positioned that the key notes of the related major and minor diatonic scales are exhibited in juxtaposition.

2. A musical chart comprising a back embodying the characters of the chromatic scale spaced at equal intervals about a circle, the characters of the chromatic scale equally spaced about an inner concentric circle and with similar characters in the two scales spaced at an interval of approximately 90 degrees, a disk centrally pivoted concentrically with the circles and provided with openings positioned to register with the outer circle and exhibit characters and spaced to correspond with the intervals of the major diatonic scale and with openings positioned to register with the inner circle and exhibit characters and spaced to correspond with the interval of the minor diatonic scale, and so positioned that the key notes of the related major and minor diatonic scales are exhibited in juxtaposition, and dissimilar index characters designating adjacent openings of the outer and inner circle properly positioned to at all times indicate the key notes of the related major and minor diatonic scales.

3. A musical chart embodying a back provided with characters representing the chromatic scale spaced at equal distance about a circle and with the characters of the chromatic scale equally spaced about an inner concentric circle and with similar characters in the two scales spaced at an interval approximating 90 degrees, a disk centrally pivoted concentric with the circles and provided with openings positioned to register with the outer circle and exhibit characters, and spaced to correspond with the intervals of the major diatonic scale and with openings positioned to register with the inner circle and exhibit characters, and spaced to correspond with the intervals of the related minor diatonic scale and so positioned that the key notes of the related major and minor diatonic scales are exhibited in juxtaposition, characters formed upon the back arranged upon three concentric circles and each including the characters of the chromatic scale with similar characters arranged radially, a disk pivoted centrally upon the back concentrically of the circles and provided with a series of openings spaced to correspond with the intervals of the tonic chord and positioned to exhibit characters in the outer circle, and with openings positioned to correspond with the intervals of the related dominant chord and to exhibit characters in the middle circle, and with openings positioned to correspond with the intervals of the related sub-dominant scale and positioned to exhibit characters in the inner circle.

In testimony whereof she has affixed her signature in presence of two witnesses.

ABBIE R. FITCH.

Witnesses:
CARLE WHITEHEAD,
WILLIAM B. SHATTUC.